United States Patent
Noh et al.

(10) Patent No.: US 8,873,415 B2
(45) Date of Patent: Oct. 28, 2014

(54) METHOD FOR TRANSMITTING SOUNDING REFERENCE SIGNAL IN WIRELESS COMMUNICATION SYSTEM AND APPARATUS FOR SAME

(75) Inventors: Min Seok Noh, Anyang-si (KR); Sung Ho Moon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 13/508,332

(22) PCT Filed: Oct. 29, 2010

(86) PCT No.: PCT/KR2010/007524
§ 371 (c)(1),
(2), (4) Date: May 4, 2012

(87) PCT Pub. No.: WO2011/090259
PCT Pub. Date: Jul. 28, 2011

(65) Prior Publication Data
US 2012/0218967 A1     Aug. 30, 2012

Related U.S. Application Data

(60) Provisional application No. 61/296,035, filed on Jan. 19, 2010, provisional application No. 61/305,080, filed on Feb. 16, 2010.

(51) Int. Cl.
*G01R 31/08* (2006.01)
*H04W 24/00* (2009.01)
*H04W 72/04* (2009.01)

(52) U.S. Cl.
CPC .......... *H04W 24/00* (2013.01); *H04W 72/0453* (2013.01)
USPC ......................................... 370/252; 370/328

(58) Field of Classification Search
CPC .................................................. H04L 25/0224
See application file for complete search history.

(56) References Cited

U.S. PATENT DOCUMENTS 4,713,808 A * 12/1987 Gaskill et al. ................. 370/314
7,349,375 B2 * 3/2008 Gerakoulis ................... 370/335
(Continued)

FOREIGN PATENT DOCUMENTS

CN          101106395 A       1/2008
CN          101330325 A       12/2008
(Continued)

OTHER PUBLICATIONS

InterDigital Communications, LLC 'Cross Carrier Operation for Bandwidth Extension', 3GPP TSG-RAN WG1Meeting #58, R1-093067, 6 pages, Shenzhen, China, Aug. 24-28, 2009.
(Continued)

*Primary Examiner* — Robert Wilson
(74) *Attorney, Agent, or Firm* — Birch, Stewart, Kolasch & Birch, LLP

(57) ABSTRACT

The present invention relates to a method in which a terminal transmits a sounding reference signal in a wireless communication system. Specifically, the method includes: receiving sounding reference signal setting information from a base station; and transmitting the sound reference signal to the base station on the basis of the sounding reference signal setting information, wherein an upstream link signal based on the sounding reference signal is transmitted over an upstream link control channel, and a frequency band corresponding to an upstream link data channel and a frequency band corresponding to an upstream link control channel are allocated as frequency resources for the sounding reference signal.

2 Claims, 10 Drawing Sheets

(56) References Cited

U.S. PATENT DOCUMENTS

| | | | |
|---|---|---|---|
| 8,145,127 B2* | 3/2012 | Nory et al. | 455/13.4 |
| 8,195,186 B2* | 6/2012 | Mitra et al. | 455/452.2 |
| 8,351,347 B2* | 1/2013 | Noh et al. | 370/252 |
| 8,391,234 B2* | 3/2013 | Nouda et al. | 370/330 |
| 2006/0035643 A1 | 2/2006 | Vook et al. | |
| 2007/0230460 A1 | 10/2007 | Jeong et al. | |
| 2008/0045260 A1* | 2/2008 | Muharemovic et al. | 455/522 |
| 2009/0034468 A1 | 2/2009 | Muharemovic et al. | |
| 2009/0042615 A1 | 2/2009 | Teo et al. | |
| 2009/0046800 A1 | 2/2009 | Xu et al. | |
| 2009/0054093 A1 | 2/2009 | Kim et al. | |
| 2009/0077444 A1 | 3/2009 | Qi et al. | |
| 2009/0088148 A1 | 4/2009 | Chung et al. | |
| 2009/0168714 A1* | 7/2009 | Tanaka et al. | 370/329 |
| 2009/0181687 A1 | 7/2009 | Tiirola et al. | |
| 2009/0196249 A1* | 8/2009 | Kawamura et al. | 370/330 |
| 2009/0213769 A1 | 8/2009 | Shen et al. | |
| 2009/0238121 A1 | 9/2009 | Kotecha | |
| 2009/0262695 A1 | 10/2009 | Chen et al. | |
| 2009/0274076 A1* | 11/2009 | Muharemovic et al. | 370/280 |
| 2009/0279447 A1 | 11/2009 | Mehta et al. | |
| 2009/0279459 A1 | 11/2009 | Muharemovic et al. | |
| 2010/0069028 A1 | 3/2010 | Choi et al. | |
| 2010/0080187 A1 | 4/2010 | Papasakellariou et al. | |
| 2010/0238845 A1 | 9/2010 | Love et al. | |
| 2010/0246561 A1 | 9/2010 | Shin et al. | |
| 2010/0303013 A1 | 12/2010 | Khandekar et al. | |
| 2011/0014909 A1 | 1/2011 | Han et al. | |
| 2011/0026478 A1 | 2/2011 | Lee et al. | |
| 2011/0038271 A1 | 2/2011 | Shin et al. | |
| 2011/0085457 A1 | 4/2011 | Chen et al. | |
| 2011/0098054 A1 | 4/2011 | Gorokhov et al. | |
| 2011/0142095 A1 | 6/2011 | Guo et al. | |
| 2011/0261716 A1* | 10/2011 | Kim et al. | 370/252 |
| 2011/0280206 A1 | 11/2011 | Johansson et al. | |
| 2012/0002568 A1 | 1/2012 | Tiirola et al. | |
| 2012/0044857 A1 | 2/2012 | Kim et al. | |
| 2012/0082124 A1 | 4/2012 | Kwon et al. | |
| 2012/0093119 A1 | 4/2012 | Kim et al. | |
| 2012/0178502 A1 | 7/2012 | Teo et al. | |
| 2012/0218967 A1* | 8/2012 | Noh et al. | 370/329 |
| 2012/0281625 A1* | 11/2012 | Noh et al. | 370/328 |
| 2013/0094448 A1 | 4/2013 | Noh et al. | |
| 2013/0215838 A1* | 8/2013 | Aiba et al. | 370/329 |
| 2013/0294382 A1 | 11/2013 | Xu et al. | |

FOREIGN PATENT DOCUMENTS

| | | |
|---|---|---|
| EP | 1 916 782 A1 | 4/2008 |
| EP | 2023504 A2 | 2/2009 |
| EP | 2086266 A2 | 8/2009 |
| JP | 2009-60595 A | 3/2009 |
| JP | 2012-503406 A | 2/2012 |
| JP | 2012-521173 A | 9/2012 |
| KR | 10-2006-0096018 A | 9/2006 |
| KR | 10-2008-0093319 A | 10/2008 |
| KR | 10-2008-0096336 A | 10/2008 |
| KR | 10-2008-0112115 A | 12/2008 |
| KR | 10-2009-0014978 A | 2/2009 |
| KR | 10-2009-0086031 A | 8/2009 |
| KR | 10-2009-0094752 A | 9/2009 |
| WO | WO 2008/101055 A2 | 8/2008 |
| WO | WO 2008/120925 A1 | 10/2008 |
| WO | WO 2008/156293 A2 | 12/2008 |
| WO | WO 2009/046009 A2 | 4/2009 |
| WO | WO 2009/088206 A2 | 7/2009 |
| WO | WO 2010/036053 A2 | 4/2010 |

OTHER PUBLICATIONS

Qualcomm Europe, 'Confirmation of various UL transmission configurations', 3GPP TSG-RAN WG1 #54, R1-083174, 4pages, Jeju, S. Korea, Aug. 18-22, 2008.

CMCC, "Related issues on PDDCH carrier indication," 3GPP TSG RAN WG1 meeting #58, R1-093268, pp. 1-3, Aug. 24-28, 2009.

Mitsubishi Electric, "UL Sounding RS Control Signaling for Antenna Selection," 3GPP RAN1#50bis, R1-073932, pp. 1-9, Oct. 8-12, 2007.

Samsung, "ACK/NAK Repetitions in E-UTRA UL," 3GPP TSG RAN WG1 #53bis, R1-082303, pp. 1-5, Jun. 30-Jul. 4, 2008.

Samsung, "SRS Transmission Issurres in LTE-A," 3GPP TSG RAN WG1 #57bis, R1-092677, pp. 1-3, Jun. 29-Jul. 3, 2009.

Samsung, "SRS Transmittsion Issues in LTE-A," 3GPP TSG RAN WG1 #57, R1-091879, pp. 1-3, May 1-8, 2009.

Toskala et al., "LTE for UMTS: OFDMA and SC-FDMA Based Radio Access," Physical Layer (Chapter 5), Jun. 12, 2009, pp. 83-135.

Nextwave Wireless et al., "UE transmit antenna selection—Technical aspects", 3GPP TSG RAN WG1 Meeting #55, R1-084432, Nov. 10-14, 2008, 6 pages provided.

Nokia Siemens Networks et al., "UL Sounding Reference Signal", 3GPP TSG RAN WG1 #49bis, R1-072988, Jun. 25-29, 2007, 5 pages provided.

Panasonic, "Sounding RS parameters", 3GPP TSG RAN WG1 Meeting #52bis, R1-081201, Mar. 31-Apr. 4, 2008, 7 pages provided.

Samsung, "SRS Transmission Issues for LTE-A", 3GPP TSG RAN WG1 #55bis, R1-090100, Jan. 14-18, 2009, 3 pages provided.

* cited by examiner (a) control-plane protocol stack (b) user-plane protocol stack

METHOD FOR TRANSMITTING SOUNDING REFERENCE SIGNAL IN WIRELESS COMMUNICATION SYSTEM AND APPARATUS FOR SAME

This application is the National Phase of PCT/KR2010/007524 filed on Oct. 29, 2010, which claims priority under 35 U.S.C. 119(e) to U.S. Provisional Application No. 61/296,035 filed on Jan. 19, 2010 and to U.S. Provisional Application No. 61/305,080 filed on Feb. 16, 2010, all of which are hereby expressly incorporated by reference into the present application.

TECHNICAL FIELD

The present invention relates to a wireless communication system, and more particularly, to a method for transmitting a sounding reference signal in a wireless communication system and an apparatus for the same.

BACKGROUND

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, carrier aggregation aims to use a plurality of frequency blocks as one great logical frequency band. A bandwidth of each frequency block may be defined based on a bandwidth of a system block used in the LTE system. Each frequency block is transmitted using a component carrier.

DISCLOSURE

Technical Problem

An object of the present invention devised to solve the conventional problem is to provide a method for transmitting a non-periodical sounding reference signal from a user equipment to a base station and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for transmitting a sounding reference signal in a wireless communication system comprises the steps of receiving sounding reference signal setting information from a base station; and transmitting the sound reference signal to the base station on the basis of the sounding reference signal setting information, wherein an uplink signal based on the sounding reference signal is transmitted through an uplink control channel, and frequency hopping in a slot unit is not performed for the uplink control channel.

Preferably, the sounding reference signal may be transmitted through a frequency band corresponding to an uplink data channel and a frequency band corresponding to the uplink control channel. Alternatively, the sounding reference signal may be transmitted through a frequency band corresponding to the uplink control channel. In this case, a basic unit of a bandwidth for transmitting the sounding reference signal is less than four resource blocks.

In another aspect of the present invention, a user equipment in a wireless communication system comprises a reception module receiving sounding reference signal setting information from a base station; a processor allocating a resource for transmitting the sound reference signal on the basis of the sounding reference signal setting information; and a transmission module transmitting the sounding reference signal to the base station by using the allocated resource, wherein the transmission module transmits an uplink signal based on the sounding reference signal through an uplink control channel, and frequency hopping in a slot unit is not performed for the uplink control channel.

Preferably, the processor may allocate a frequency band corresponding to an uplink data channel and a frequency band corresponding to the uplink control channel as frequency resources for the sounding reference signal. Alternatively, the processor may allocate a frequency band corresponding to the uplink control channel as a frequency resource for the sounding reference signal, and a basic unit of a bandwidth for transmitting the sounding reference signal is less than four resource blocks.

In still another aspect of the present invention, a method for transmitting a sounding reference signal from a user equipment in a wireless communication system comprises the steps of transmitting a periodical sounding reference signal to a base station for a first subframe; and transmitting an additional sounding reference signal from the base station for a second subframe, wherein the second subframe is subsequent to the first subframe. In this case, the additional sounding reference signal has a transmission period the same as that of the periodical sounding reference signal.

Preferably, if the additional sounding reference signal is set equally to the periodical sounding reference signal, at least one of orthogonal cover codes, random sequences and masking sequences is applied to the first subframe and the second subframe.

In further still another aspect of the present invention, a user equipment in a wireless communication system comprises a processor allocating a resource for transmitting a sounding reference signal; and a transmission module transmitting the sounding reference signal to a base station by using the allocated resource, wherein the processor allocates a first subframe as a time resource for a periodical sounding reference signal and allocates a second subframe as a time resource for an additional sounding reference signal, and the second subframe is subsequent to the first subframe. In this case, the processor sets a transmission period of the additional sounding reference signal equally to that of the periodical sounding reference signal.

Preferably, if the additional sounding reference signal is set equally to the periodical sounding reference signal, the processor applies at least one of orthogonal cover codes, random sequences and masking sequences to the first subframe and the second subframe.

Advantageous Effects

According to the embodiments of the present invention, in a wireless communication system, a user equipment can effectively transmit a sounding reference signal to a base station.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as that of the system block of the legacy system. On the other hand, there is no limitation in sizes of the other frequency blocks. However, for system simplification, the sizes of the other frequency blocks may be determined based on the size of the system block of the legacy system. For example, the 3GPP LTE system and the 3GPP LTE-A system are evolved from the legacy system.

Based on the aforementioned definition, the 3GPP LTE system will herein be referred to as an LTE system or the legacy system. Also, a user equipment that supports the LTE system will be referred to as an LTE user equipment or a legacy user equipment. The 3GPP LTE-A system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
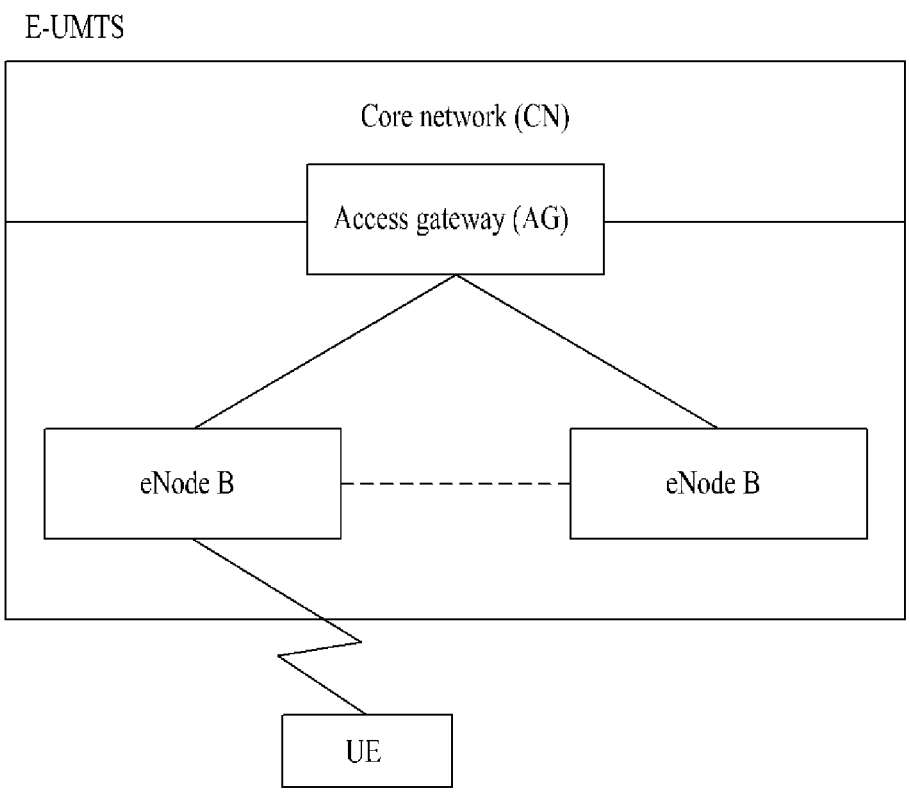
FIG. 1 is a diagram conceptionally illustrating a network structure of an Evolved Universal Mobile Telecommunications System (E-UMTS)
Figure 2:
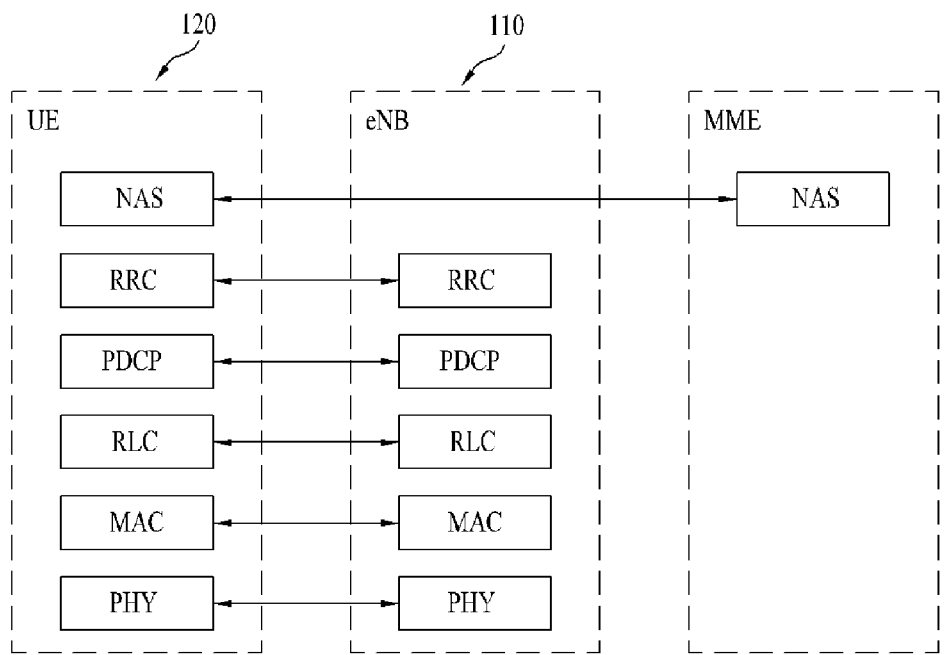
FIG. 2 is a diagram illustrating structures of a control plane and a user plane of a radio interface protocol between a user equipment and E-UTRAN based on the 3GPP radio access network standard.
Figure 2:
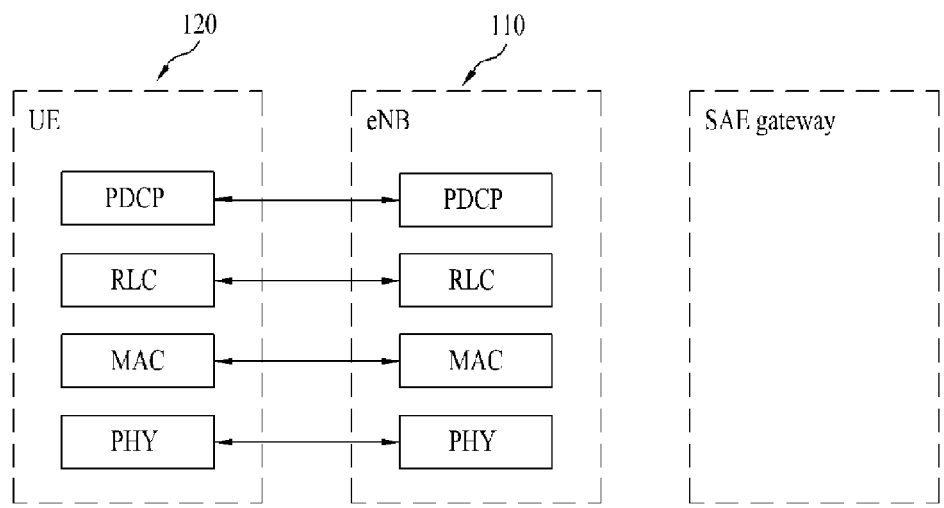

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
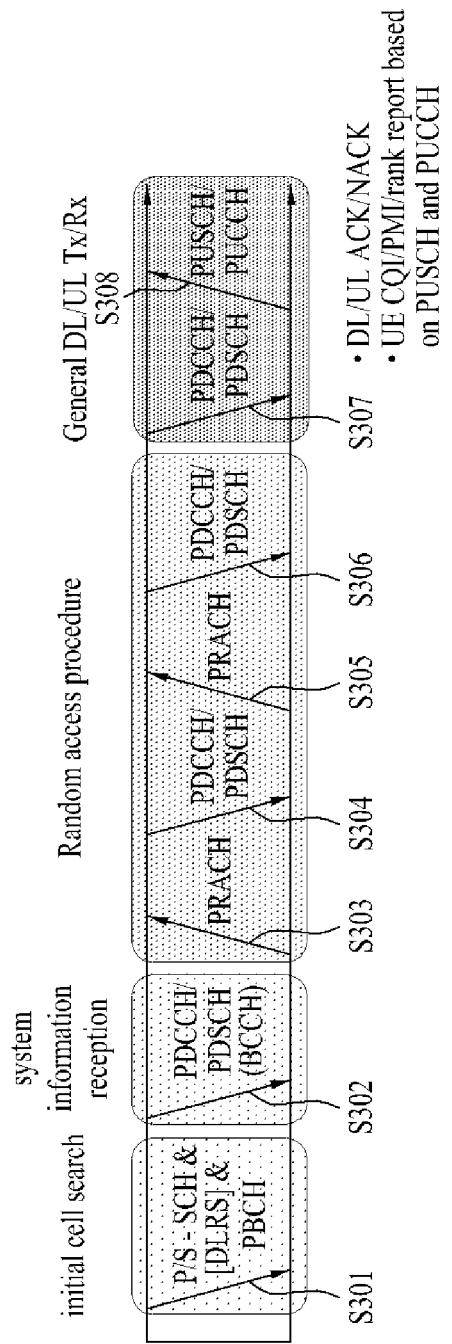
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the mean time, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
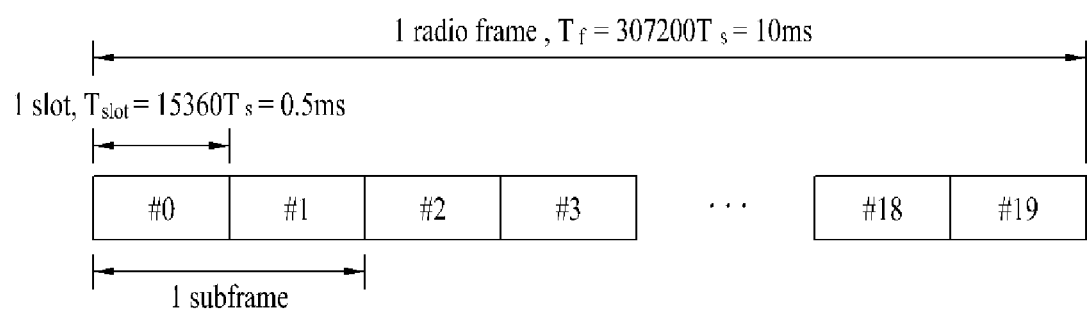
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes ten (10) subframes of an equal size. Each sub frame has a length of 1 ms and includes two slots. Each slot has a length of 0.5 ms ($15360 \cdot T_s$). In this case, $T_s$ represents a sampling time, and is expressed by $T_s=1/(15 \text{ kHz} \times 2048)=3.2552 \times 10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
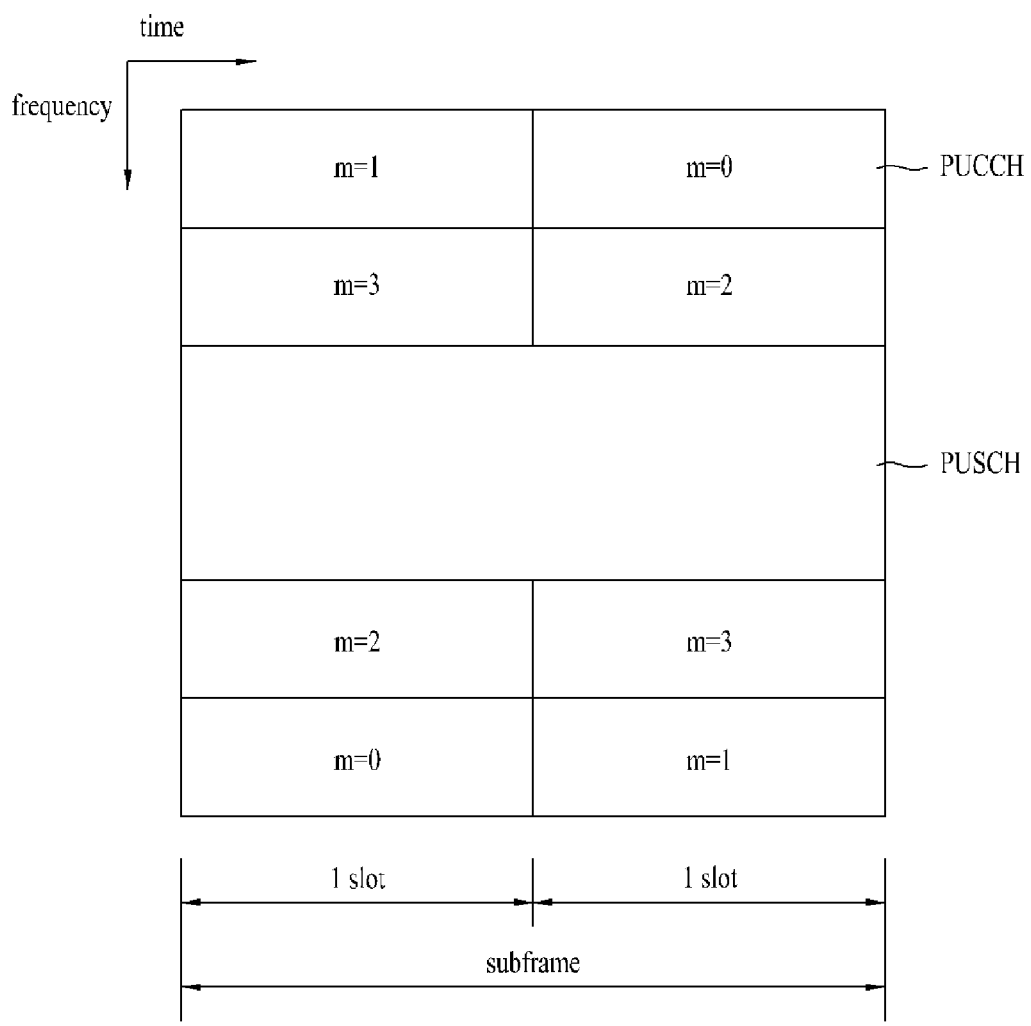
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe includes a plurality of slots (for example, two slots). The slot may include a different number of SC-FDMA symbols depending on a CP length. For example, in case of a normal CP, the slot may include seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1, 2, 3) located at both ends of the data region on the frequency axis, and is hopped using the slot as a boundary. The control information includes HARQ ACK/NACK, channel quality indicator (CQI), precoding matrix index (PMI), and rank index (RI).

Figure 6:
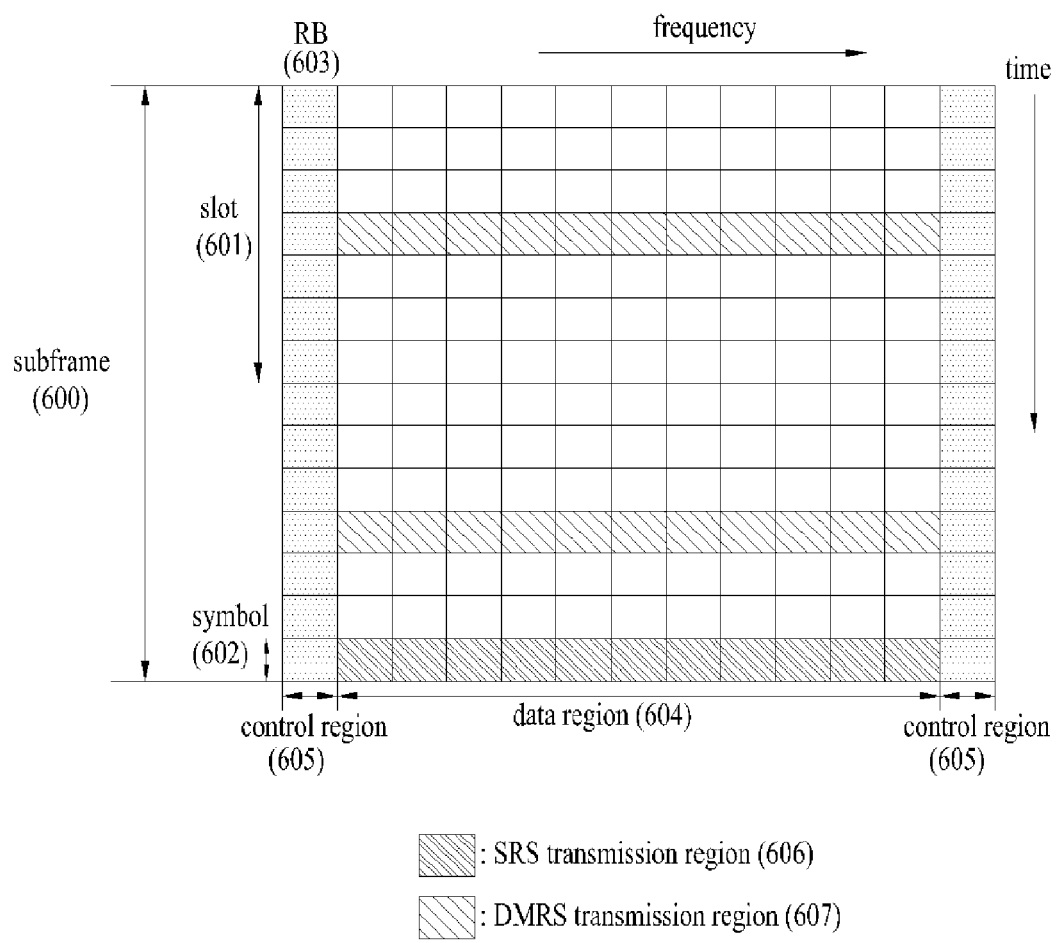
FIG. 6 is a diagram illustrating another structure of an uplink subframe used in an LTE system.

FIG. 6 is a diagram illustrating a structure of an uplink subframe used in an LTE system.

Referring to FIG. 6, a subframe 600 having a length of 1 ms, which is a basic unit of LTE uplink transmission, includes two slots 601 of 0.5 ms. In case of normal cyclic prefix (CP) length, each slot includes seven symbols 602, each of which corresponds to one SC-FDMA symbol. A resource block 603 is a resource allocation unit corresponding to twelve (12) subcarriers in a frequency domain and one slot in a time domain. A structure of an LTE uplink subframe is classified into a data region 604 and a control region 605. In this case, the data region means a series of communication resources used for transmission of data such as voice and packet transmitted to each user equipment, and corresponds to the other resources except for the control region within the subframe. The control region means a series of communication resources used for transmission of downlink channel quality report, ACK/NACK of a downlink signal, and uplink scheduling request from each user equipment.

As illustrated in FIG. 6, an interval 606 for which a sounding reference signal may be transmitted within one subframe is a duration where SC-FDMA symbol at the last location on a time axis of one subframe exists, and the sounding reference signal is transmitted through a data transmission band on a frequency axis. Sounding reference signals of several user equipments, which are transmitted to the last SC-FDMA of the same subframe, may be identified depending on the frequency location.

Also, the sounding reference signal includes constant amplitude zero auto correlation (CAZAC) sequences. The sounding reference signals transmitted from a plurality of user equipments are CAZAC sequences $r^{SRS}(n)=r_{u,v}^{(\alpha)}(n)$ having different cyclic shift values $\alpha$ based on the following Equation 1.

$$\alpha = 2\pi \frac{n_{SRS}^{cs}}{8} \quad \text{[Equation 1]}$$

In this case, $n_{SRS}^{cs}$ is a value set for each user equipment by the upper layer, and has an integer value between 0 and 7. Accordingly, the cyclic shift value may have eight values depending on $n_{SRS}^{cs}$.

The CAZAC sequences generated from one CAZAC sequence through cyclic shift have zero-correlation values with the other sequences having their respective cyclic shift values different from one another. The sounding reference signals of the same frequency domain may be identified from one another depending on the CAZAC sequence cyclic shift values by using the above zero-correlation feature. The sounding reference signal of each user equipment is allocated on the frequency depending on a parameter set by the base station. The user equipment performs frequency hopping of the sounding reference signal to transmit the sounding reference signal to all of uplink data transmission bandwidths.

Hereinafter, a detailed method for mapping a physical resource for transmitting a sounding reference signal in an LTE system will be described.

After being multiplied by an amplitude scaling parameter $\beta_{SRS}$ to satisfy the transmission power $P_{SRS}$ of the user equipment, the sounding reference signal sequence $r^{SRS}(n)$ is mapped into a resource element (RE) having an index of (k, l) from $r^{SRS}(0)$ by the following Equation 2.

$$a_{2k+k_0,l} = \begin{cases} \beta_{SRS} r^{SRS}(k) & k=0, 1, \ldots, M_{sc,b}^{RS}-1 \\ 0 & \text{otherwise} \end{cases} \quad \text{[Equation 2]}$$

In the above Equation 2, $k_0$ denotes a frequency domain start point of the sounding reference signal, and is defined as expressed by the following Equation 3.

$$k_0 = k_0' + \sum_{b=0}^{B_{SRS}} 2M_{sc,b}^{RS} n_b \quad \text{[Equation 3]}$$

In the above Equation 3, $n_b$ denotes a frequency location index. Also, $k_0'$ for a general uplink subframe is defined as expressed by the following Equation 4, and $k_0'$ for an uplink pilot timeslot (UpPTS) is defined as expressed by the following Equation 5.

$$k_0' = (\lfloor N_{RB}^{UL}/2 \rfloor - m_{SRS,0}/2)N_{SC}^{RB} + k_{TC} \quad \text{[Equation 4]}$$

$$k_0' = \begin{cases} (N_{RB}^{UL} - m_{SRS,0}^{max})N_{SC}^{RB} + k_{TC} & \text{if } ((n_f \bmod 2) \times (2-N_{SP}) + t_{RA}^1) \bmod 2 = 0 \\ k_{TC} & \text{otherwise} \end{cases} \quad \text{[Equation 5]}$$

In the Equation 4 and the Equation 5, $k_{TC}$ is a transmissionComb parameter signaled to the user equipment through the upper layer and has a value of 0 or 1. Also, $n_{hf}$ is 0 at the uplink pilot timeslot of the first half frame and 0 at the uplink pilot timeslot of the second half frame. $M_{sc,b}^{RS}$ is a length, i.e., bandwidth, of a sounding reference signal sequence, which is expressed in a unit of subcarrier defined as expressed by the following Equation 6.

$$M_{sc,b}^{RS} = m_{SRS,b} N_{sc}^{RB}/2 \quad \text{[Equation 6]}$$

In the Equation 6, $m_{SRS,b}$ is a value signaled from the base station depending on an uplink bandwidth $N_{RB}^{UL}$ as illustrated in the following Table 1 to Table 4.

In order to acquire $m_{SRS,b}$, a cell specific parameter $C_{SRS}$ having an integer value between 0 and 7 and a user equipment specific parameter $B_{SRS}$ having an integer value between 0 and 3 are required. These values $C_{SRS}$ and $B_{SRS}$ are given by the upper layer.

TABLE 1

$b_{hop} = 0, 1, 2, 3,$ and $6 \leq N_{RB}^{UL} \leq 40.$

| SRS bandwidth configuration $C_{SRS}$ | SRS-Bandwidth $B_{SRS} = 0$ $m_{SRS,b}$ | $N_b$ | SRS-Bandwidth $B_{SRS} = 1$ $m_{SRS,b}$ | $N_b$ | SRS-Bandwidth $B_{SRS} = 2$ $m_{SRS,b}$ | $N_b$ | SRS-Bandwidth $B_{SRS} = 3$ $m_{SRS,b}$ | $N_b$ |
|---|---|---|---|---|---|---|---|---|
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3,$ and $40 < N_{RB}^{UL} \leq 60.$

| SRS bandwidth configuration $C_{SRS}$ | SRS-Bandwidth $B_{SRS} = 0$ $m_{SRS,0}$ | $N_0$ | SRS-Bandwidth $B_{SRS} = 1$ $m_{SRS,1}$ | $N_1$ | SRS-Bandwidth $B_{SRS} = 2$ $m_{SRS,2}$ | $N_2$ | SRS-Bandwidth $B_{SRS} = 3$ $m_{SRS,3}$ | $N_3$ |
|---|---|---|---|---|---|---|---|---|
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3,$ and $60 < N_{RB}^{UL} \leq 80.$

| SRS bandwidth configuration $C_{SRS}$ | SRS-Bandwidth $B_{SRS} = 0$ $m_{SRS,0}$ | $N_0$ | SRS-Bandwidth $B_{SRS} = 1$ $m_{SRS,1}$ | $N_1$ | SRS-Bandwidth $B_{SRS} = 2$ $m_{SRS,2}$ | $N_2$ | SRS-Bandwidth $B_{SRS} = 3$ $m_{SRS,3}$ | $N_3$ |
|---|---|---|---|---|---|---|---|---|
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3,$ and $80 < N_{RB}^{UL} \leq 110.$

| SRS bandwidth configuration $C_{SRS}$ | SRS-Bandwidth $B_{SRS} = 0$ $m_{SRS,0}$ | $N_0$ | SRS-Bandwidth $B_{SRS} = 1$ $m_{SRS,1}$ | $N_1$ | SRS-Bandwidth $B_{SRS} = 2$ $m_{SRS,2}$ | $N_2$ | SRS-Bandwidth $B_{SRS} = 3$ $m_{SRS,3}$ | $N_3$ |
|---|---|---|---|---|---|---|---|---|
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the user equipment may perform frequency hopping of the sounding reference signal to transmit the sounding reference signal to all the uplink data transmission bandwidths. The frequency hopping is set by a parameter $b_{hop}$ having a value of 0 to 3 given by the upper layer.

If frequency hopping of the sounding reference signal is not activated, i.e., in case of $b_{hop} \geq B_{SRS}$, the frequency location index $n_b$ has a constant value as expressed by the following Equation 7. In the Equation 7, $n_{RRC}$ is a parameter given by the upper layer.

$$n_b = \lfloor 4n_{RRC}/m_{SRS,b} \rfloor \bmod N_b \quad \text{[Equation 7]}$$

Meanwhile, if frequency hopping of the sounding reference signal is activated, i.e., in case of $b_{hop} < B_{SRS}$, the frequency location index $n_b$ is defined as expressed by the following Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 8]}$$

$$F_b(n_{SRS}) = \begin{cases} (N_b/2)\left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 9]}$$

In this case, $n_{SRS}$ is a parameter that calculates the number of transmission times of the sounding reference signal and is defined by the following Equation 10.

$$n_{SRS} = \begin{cases} 2N_{SP}n_f + 2(N_{SP}-1)\lfloor\frac{n_s}{10}\rfloor + \lfloor\frac{T_{offset}}{T_{offset\_max}}\rfloor, & \text{for 2ms SRS periodicity of TDD frame structure} \\ \lfloor(n_f \times 10 + \lfloor n_s/2 \rfloor)/T_{SRS}\rfloor, & \text{otherwise} \end{cases}$$

[Equation 10]

In the Equation 10, $T_{SRS}$ is a period of the sounding reference signal, and $T_{offset}$ denotes subframe offset of the sounding reference signal. Also, $n_s$ denotes a slot number, and $n_f$ denotes a frame number.

A user equipment specific sounding reference signal setup index $I_{SRS}$ for setting the period $T_{SRS}$ of the user equipment specific sounding reference signal and the subframe offset $T_{offset}$ is expressed as illustrated in the following Table 5 and Table 6 depending on FDD and TDD. In particular, Table 5 illustrates the user equipment specific sounding reference signal setup index in case of the FDD, and Table 6 illustrates the user equipment specific sounding reference signal setup index in case of the TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | Reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | Reserved | reserved |

Hereinafter, for application of a transmission diversity scheme during PUCCH transmission which will be defined in the LTE-A system, sounding reference signal transmission at a PUCCH region will be described.

As described in FIG. 5, the PUCCH includes RB pair located at both ends of the data region on the frequency axis, and performs hopping at a slot boundary. If a transmission diversity scheme is applied to the PUCCH, since slot diversity gain currently defined in the LTE Rel-8 is not acquired, throughput degradation may occur as compared with the case where frequency hopping is performed.

As described in FIG. 6, the region to which the sounding reference signal may be transmitted is the duration where SC-FDMA symbol at the last location on the time axis of one subframe exists, and the sounding reference signal is generally transmitted through a data transmission band, i.e., PUSCH region, on the frequency axis. However, the present invention suggests sounding reference signal transmission at the PUCCH region to enable packet scheduling in the frequency domain, thereby preventing throughput degradation from being generated when frequency hopping is not performed during PUCCH transmission.

First of all, a method for supporting a frequency location for sounding transmission from a PUCCH by expanding resource allocation of a sounding reference signal defined in the LTE Rel-8 will be required. In other words, since a bandwidth of a sounding reference signal defined in the LTE Rel-8 is configured in a unit of 4 RBs, a method for expanding a bandwidth for transmission of a sounding reference signal defined in the LTE Rel-8 to reach a PUCCH region by expanding a bandwidth of a sounding reference signal allocated in a unit of 4 RBs may be considered. Also, even in case that sounding is performed by a maximum sounding bandwidth in accordance with each system bandwidth defined in the LTE Rel-8, it may be considered that a PUCCH region is included in a frequency region to which a sounding reference signal is transmitted.

At this time, indication for configuration of a sounding reference signal transmitted through a PUCCH region may be defined separately through RRC parameter and signaled explicitly, or may be signaled through L1/L2 control signal. Also, indication for configuration of the sounding reference signal may be signaled implicitly in accordance with setup information of a transmission mode (MIMO transmission or discontinuous resource allocation based transmission) or the status of the user equipment.

In the meantime, for sounding reference signal transmission to the PUCCH region, sounding may be set by a bandwidth smaller than that of 4 RBs, which is not defined in the Rel-8. In this case, examples of the bandwidth smaller than that of 4 RBs may include 1 RB, 2 RBs, and 3 RBs, or may be configured by another type not the RB unit.

As described above, the user equipment transmits the sounding reference signal by receiving RRC signaling parameter from the base station. By contrast, the base station commands the user equipment to transmit a non-periodical sounding reference signal, and the user equipment transmits the non-periodical sounding reference signal to the base station in accordance with the command.

Next, another method for increasing coverage of a sounding reference signal will be described.

The user equipment of the existing LTE system transmits an uplink signal on the basis of one radio frequency (RF) power amplifier chain. In particular, if the user equipment performs uplink transmission using two physical antennas, an antenna selection scheme is used, in which an output of one RF power amplifier is switched into physical antennas on a time resource region.

Unlike the above LTE system, the user equipment may retain a plurality of transmitting antennas and a plurality of RF power amplifier chains and at the same time transmit an uplink signal to the plurality of transmitting antennas. In this case, since the transmission power allocated to each transmitting antenna is reduced by sharing of a total of transmission powers based on the number of transmitting antennas, coverage of the sounding reference signal may be an important issue. Accordingly, coverage of the sounding reference signal of the user equipment in the LTE-A system that performs uplink transmission simultaneously through a plurality of antennas may be more reduced than that of the user equipment in the LTE system that performs uplink transmission through a single antenna, whereby a method for increasing coverage of the sounding reference signal is required.

Although sounding may be set by a bandwidth smaller than that of 4 RBs, which is not defined in the Rel-8, for sounding reference signal transmission to the PUCCH region, this may increase coverage of the sounding reference signal. As a minimum bandwidth for the sounding reference signal is reduced, power spectral density (PSD) of the sounding reference signal transmitted through a plurality of antennas of the user equipment in the LTE-A system may be set equally to that of the sounding reference signal transmitted through a single antenna of the user equipment in the LTE system. However, in this case, there are problems in that it is difficult to ensure lower compatibility with the LTE system and additional delay may occur for bandwidth measurement.

Next, a method for repeatedly transmitting additional sounding reference signal from a user equipment located at a cell edge to a base station may be considered. For example, a method for continuously transmitting additional sounding reference signal in a subframe unit may be considered. As shown in FIG. 6, a method for using DM-RSs included in continuous slots for one subframe as non-periodical sounding reference signals may be considered.

In more detail, as a method for additionally transmitting a sounding reference signal for continuous subframes, a period of a subframe for which additional reference signal is transmitted may be set in accordance with a transmission period of a periodical sounding reference signal defined in the LTE system.

Figure 7:
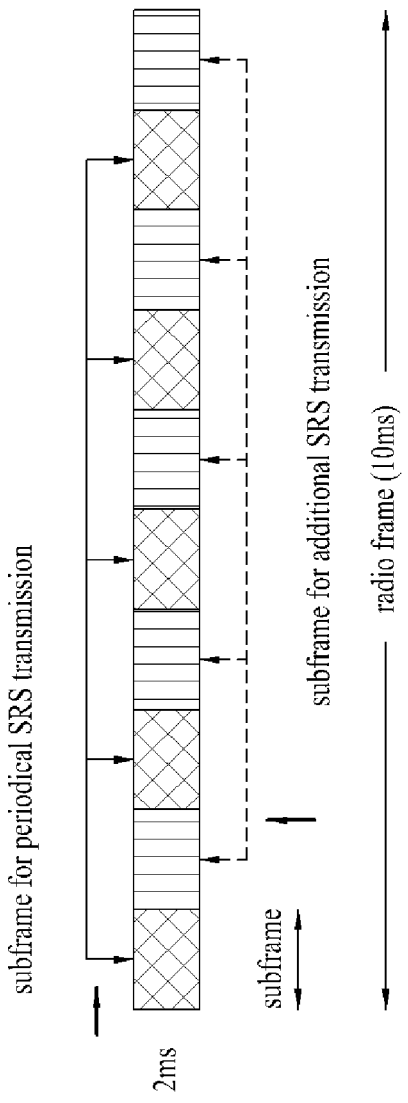
FIG. 7 to FIG. 9 are diagrams illustrating a method for transmitting an additional sounding reference signal in accordance with the embodiment of the present invention.
Figure 8:
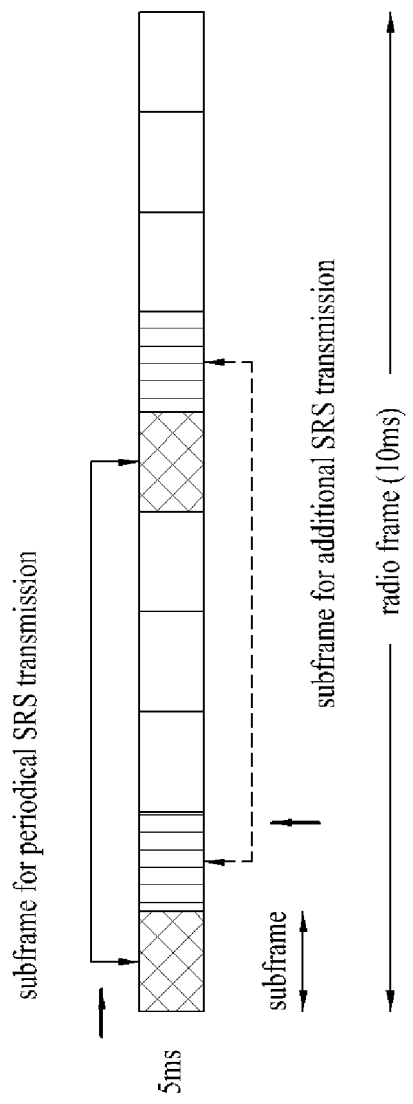
Figure 9:
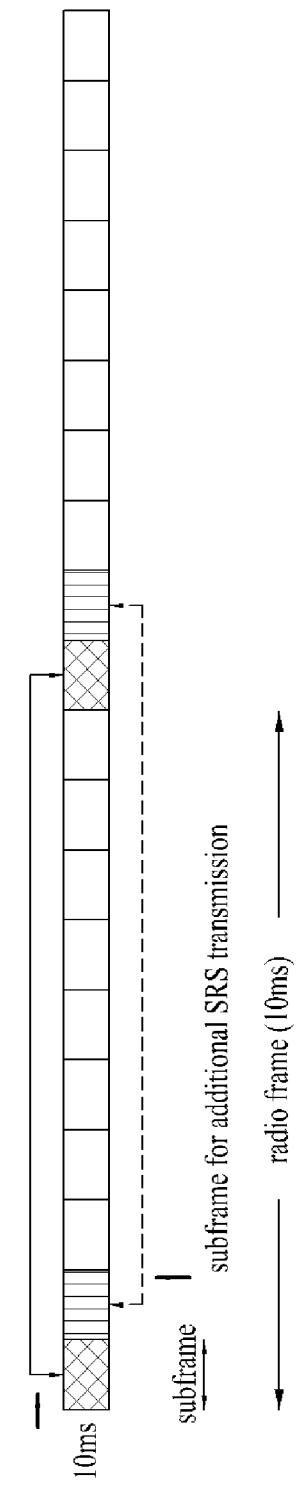

FIG. 7 to FIG. 9 are diagrams illustrating a method for transmitting an additional sounding reference signal in accordance with the embodiment of the present invention.

Referring to FIG. 7, a period of a periodical sounding reference signal is 2 ms, and an additional sounding reference signal may be set in such a manner that it is transmitted for continuous subframes as soon as the periodical sounding reference signal is transmitted.

FIG. 8 illustrates that a period of a periodical sounding reference signal is 5 ms, and FIG. 9 illustrates that a period of a periodical sounding reference signal is 10 ms. Like FIG. 7, an additional sounding reference signal may be set in such a manner that it is transmitted for continuous subframes as soon as the periodical sounding reference signal is transmitted.

According to the above method, the user equipment may additionally transmit the sounding reference signal in a subframe unit continuously, and coverage of the sounding reference signal may be increased in accordance with repeated transmission of the sounding reference signal.

The periodical sounding reference signal may be transmitted in such a manner that a parameter is provided from the base station through RRC signaling on the basis of the definition in the LTE system, and the additional non-periodical sounding reference signal may be transmitted in such a manner that information on transmission triggering or transmission setup information such as bandwidth is signaled from the base station implicitly or explicitly.

In the meantime, the periodical sounding reference signal and the additional non-periodical sounding reference signal, which are transmitted for continuous subframes, may have the same setup information. In this case, combining gain may be acquired by orthogonal cover codes, random sequences or masking sequences applied among the continuous subframes.

Figure 10:
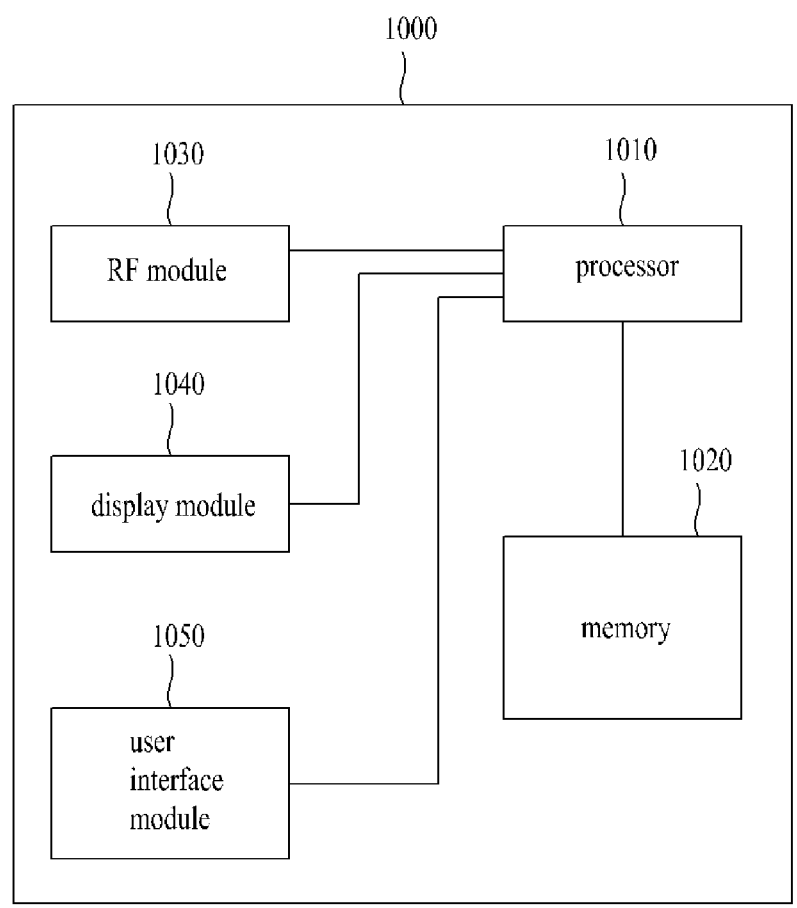
FIG. 10 is a block diagram illustrating a communication transceiver according to the embodiment of the present invention.

FIG. 10 is a block diagram illustrating a communication transceiver according to the embodiment of the present invention. The transceiver may be a part of the base station or the user equipment.

Referring to FIG. 10, the transceiver 1000 includes a processor 1010, a memory 1020, a radio frequency (RF) module 1030, a display module 1040, and a user interface module 1050.

The transceiver 1000 is illustrated for convenience of description, and some of its modules may be omitted. Also, the transceiver 1000 may further include necessary modules. Moreover, some modules of the transceiver 1000 may be divided into segmented modules. The processor 1010 is configured to perform the operation according to the embodiment of the present invention illustrated with reference to the drawings.

In more detail, if the transceiver 1000 is a part of the base station, the processor 1010 may generate a control signal and map the control signal into a control channel configured within a plurality of frequency blocks. Also, if the transceiver 1000 is a part of the user equipment, the processor 1010 may identify the control channel indicated by the signal received from the plurality of frequency blocks and extract the control signal from the control channel.

Afterwards, the processor 1010 may perform the operation required based on the control signal. The detailed operation of the processor 1010 may be understood with reference to the description of FIG. 1 to FIG. 9.

The memory 1020 is connected with the processor 1010 and stores an operating system, an application, a program code, and data therein. The RF module 1030 is connected with the processor 1010 and converts a baseband signal to a radio signal or vice versa. To this end, the RF module 1030 performs analog conversion, amplification, filtering and frequency uplink conversion, or their reverse processes. The display module 1040 is connected with the processor 1010 and displays various kinds of information. Examples of the display module 1040 include, but not limited to, a liquid crystal display (LCD), a light emitting diode (LED), and an organic light emitting diode (OLED). The user interface module 1050 is connected with the processor 1010, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be a wireless communication system. In more detail, the present invention may be applied to a method and apparatus for transmitting a non-periodical sounding reference signal in a wireless communication system to which a frequency aggregation scheme is applied.

The invention claimed is:

1. A method for transmitting sounding reference signals via a plurality of antennas from a user equipment in a wireless communication system, the method comprising:
  receiving information for triggering an additional sounding reference signal from a base station; and
  transmitting a periodical sounding reference signal and the additional sounding reference signal via the plurality of antennas to the base station in a subframe including first and second slots, each of the first and second slots including a plurality of symbols,
  wherein one symbol is reserved for a DM-RS (DeModulation-Reference Signal) in each of the first and second slots,
  wherein the periodical sounding reference signal is transmitted on a last symbol in the second slot of the subframe, and
  wherein the additional sounding reference signal is transmitted repeatedly on the one symbol reserved for the DM-RS in each of the first and second slots of the subframe.

2. The method according to claim 1, wherein the additional sounding reference signal has a transmission period the same as that of the periodical sounding reference signal.

* * * * *